(12) United States Patent
Karasawa (10) Patent No.: US 8,848,095 B2
(45) Date of Patent: Sep. 30, 2014

(54) FOCUS DETECTOR, AND LENS APPARATUS AND IMAGE PICKUP APPARATUS INCLUDING THE SAME

(75) Inventor: Katsumi Karasawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 66 days.

(21) Appl. No.: 13/568,570

(22) Filed: Aug. 7, 2012

(65) Prior Publication Data

US 2013/0038779 A1 Feb. 14, 2013

(30) Foreign Application Priority Data

Aug. 8, 2011 (JP) .................................. 2011-172763

(51) Int. Cl.
*H04N 5/232* (2006.01)
*G02B 7/36* (2006.01)

(52) U.S. Cl.
CPC ........................................ *G02B 7/36* (2013.01)
USPC ........................................................ 348/350

(58) Field of Classification Search
CPC ...... H04N 5/23212; G03B 13/36; G03B 3/10; G03B 13/20; G02B 7/34; G02B 7/32
USPC ........... 348/345, 348–350; 356/3.08; 396/120
See application file for complete search history.

(56) References Cited

U.S. PATENT DOCUMENTS

| | | | |
|---|---|---|---|
| 5,359,383 A | 10/1994 | Miida et al. | |
| 6,411,782 B1 * | 6/2002 | Kindaichi | 396/196 |
| 6,433,859 B1 * | 8/2002 | Nakata | 356/3.14 |
| 6,614,509 B2 * | 9/2003 | Nonaka et al. | 356/3.14 |
| 8,036,521 B2 | 10/2011 | Ono et al. | |
| 8,634,015 B2 | 1/2014 | Kimura | |
| 8,711,270 B2 | 4/2014 | Onuki et al. | |
| 2003/0123871 A1 * | 7/2003 | Yoshida et al. | 396/123 |
| 2005/0036128 A1 | 2/2005 | Mihara et al. | |
| 2011/0164166 A1 * | 7/2011 | Oikawa | 348/340 |
| 2013/0076970 A1 * | 3/2013 | Kishi | 348/349 |

FOREIGN PATENT DOCUMENTS

| | | |
|---|---|---|
| CN | 101750847 A | 6/2010 |
| CN | 101960353 A | 1/2011 |
| JP | 2010066712 A | 3/2010 |
| JP | 2010091991 A | 4/2010 |

OTHER PUBLICATIONS

Extended European Search Report issued in European counterpart application No. EP 12179463.0, dated Mar. 26, 2013.
Chinese Office Action in Chinese counterpart application No. CN201210274495.8, dated Jun. 4, 2014. English translation provided.

* cited by examiner

Primary Examiner — Timothy J Henn
(74) *Attorney, Agent, or Firm* — Rossi, Kimms & McDowell LLP (57) ABSTRACT

A focus detector for detecting a defocus amount of an image pickup optical system based on a displacement amount between two images formed by two beams divided from the image pickup optical system and passed through two pupil areas, the focus detector including: two lenses; two phase difference sensors for photoelectrically converting two subject images formed by the two lenses into two image signals; a correlation computing unit for dividing the two image signals based on a reference number-of-pixels to compute an image displacement amount for each divided area; a waveform coincidence computing unit for computing a coincidence degree of the two image signals in the each divided area in which the image displacement amount is computed by the correlation computing unit; and a defocus computing unit for computing a defocus amount based on the coincidence degree of the two image signals computed by the waveform coincidence computing unit.

9 Claims, 12 Drawing Sheets

FOCUS DETECTOR, AND LENS APPARATUS AND IMAGE PICKUP APPARATUS INCLUDING THE SAME

BACKGROUND OF THE INVENTION

1. Field of the Invention

The present invention relates to an optical apparatus such as a television lens or a video lens, and more particularly, to a focus detector for automatic focus function, a lens apparatus including the focus detector, and an image pickup apparatus including the focus detector.

2. Description of the Related Art

Conventionally, there are various proposals as an automatic focus (AF) technology for an image pickup apparatus such as a camera or a video camera. For instance, the following automatic focus adjustment method is well known. Light beams from a subject passing through different exit pupil areas of an image pickup lens are guided to form images on a pair of line sensors, and the subject images are photoelectric-converted so as to obtain a pair of image signals. Then, a relative position displacement amount between the image signals is determined. Based on this displacement amount, a defocus amount of the subject is calculated so as to drive the image pickup lens for the automatic focus adjustment.

This AF system using phase difference detection can determine an in-focus position of a focus lens from a subject distance, and hence has a feature that focusing can be performed faster than in a contrast AF system.

Japanese Patent Application Laid-Open No. 2010-66712 discloses a method of increasing a defocus range of focus detection by decreasing the number of pixels to be subject to correlation computation on the pair of line sensors to be used for normal phase difference detection so as to increase a pixel shift amount for the correlation computation, in order to reduce the probability of automatically entering a scan AF mode for detecting a focus shift while driving the focus lens when the focus detection by the phase difference detection method cannot be performed.

However, although the method of Japanese Patent Application Laid-Open No. 2010-66712 can increase the defocus range of focus detection, detection accuracy is deteriorated because the number of pixels to be subject to correlation computation is reduced. In addition to that, when plural subject images of plural subjects at different subject distances exist on the pair of line sensors of the AF sensor respectively, there is a problem that an erroneous detection is apt to occur (subject images of different subjects existing on different line sensors are erroneously detected as subject images of the same subject).

SUMMARY OF THE INVENTION

The present invention provides a focus detector for detecting a defocus amount of an image pickup optical system based on a displacement amount between a pair of images formed by a pair of light beams divided from the image pickup optical system and passed through a pair of pupil areas, the focus detector including: a pair of lenses; a pair of phase difference detecting sensors for photoelectrically converting a pair of subject images formed by the pair of lenses into a pair of image signals; a first correlation computing unit for dividing the pair of image signals based on a reference number-of-pixels to compute an image displacement amount for each divided area; a waveform coincidence degree computing unit for computing a coincidence degree of the pair of image signals in the each divided area in which the image displacement amount is computed by the first correlation computing unit; and a defocus amount computing unit for computing a defocus amount based on the coincidence degree of the pair of image signals computed by the waveform coincidence degree computing unit.

According to the present invention, even when plural subject images of plural subjects at different subject distances exist on the pair of phase difference detecting sensors respectively, an accurate distance measurement result can be obtained without occurrence of an erroneous detection. Thus, it is possible to provide the focus detector which can achieve both an improvement of focus detection accuracy and an increase of a defocus range.

Further features of the present invention will become apparent from the following description of exemplary embodiments with reference to the attached drawings.

DESCRIPTION OF THE EMBODIMENTS

Hereinafter, an exemplary embodiment of the present invention is described in detail with reference to the attached drawings.

[Embodiment]

Figure 1:
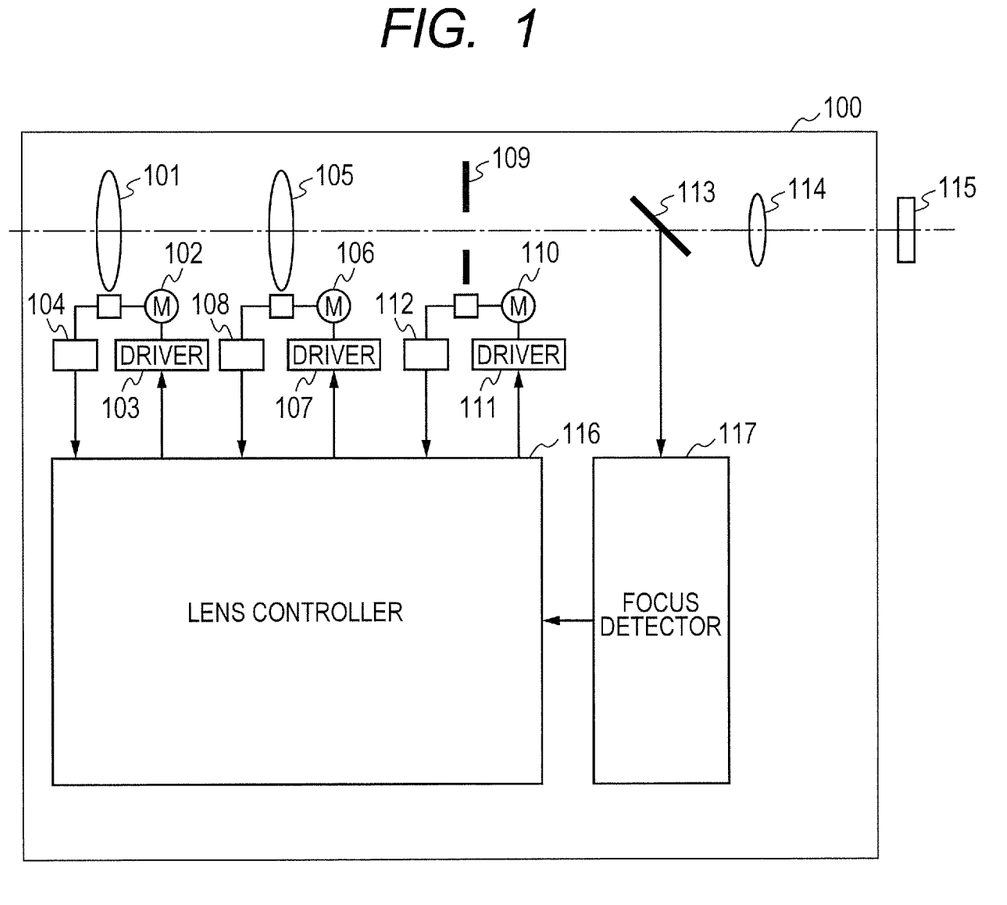
FIG. 1 is a block diagram of a zoom lens apparatus including a focus detector of an embodiment of the present invention.

FIG. 1 is a block diagram of a zoom lens apparatus 100 including an automatic focus adjustment device of the present invention.

The zoom lens apparatus 100 is equipped with an image pickup optical system including a focus lens 101, a zoom lens 105, an aperture stop 109, a beam splitting prism 113, and a relay lens 114. The focus lens 101 is driven by a focus motor 102 as a focus lens driving unit to move in an optical axis direction, so as to change a position of an image plane of the zoom lens apparatus 100 in the optical axis direction. The focus motor 102 is driven by a focus driver 103. A position of the focus lens 101 is detected by a focus lens position detector 104.

The zoom lens 105 is driven by a zoom motor 106 to move in the optical axis direction so as to change a focal length of the zoom lens apparatus 100. The zoom motor 106 is driven by a zoom driver 107. A position of the zoom lens 105 is detected by a zoom position detector 108.

The aperture stop 109 is driven by an iris motor 110, which is driven by an iris driver 111. A position of the aperture stop 109 is detected by an iris position detector 112.

The beam splitting prism 113 splits light from the subject after passing through the focus lens 101 and the zoom lens 105 into transmitted light and reflected light. The light beam after passing through the beam splitting prism 113 (transmitted light) passes through the relay lens 114 and enters an image pickup element 115 of a camera apparatus or the like to which the zoom lens apparatus is connected. In addition, the light beam reflected by the beam splitting prism 113 (reflected light) enters a focus detector 117. The focus detector 117 calculates a phase difference between a pair of image signals so as to calculate a defocus amount. A lens controller 116 drives the focus lens 101 and controls the zoom lens 105 and the aperture stop 109 based on the phase difference obtained by the focus detector 117.

Figure 2:
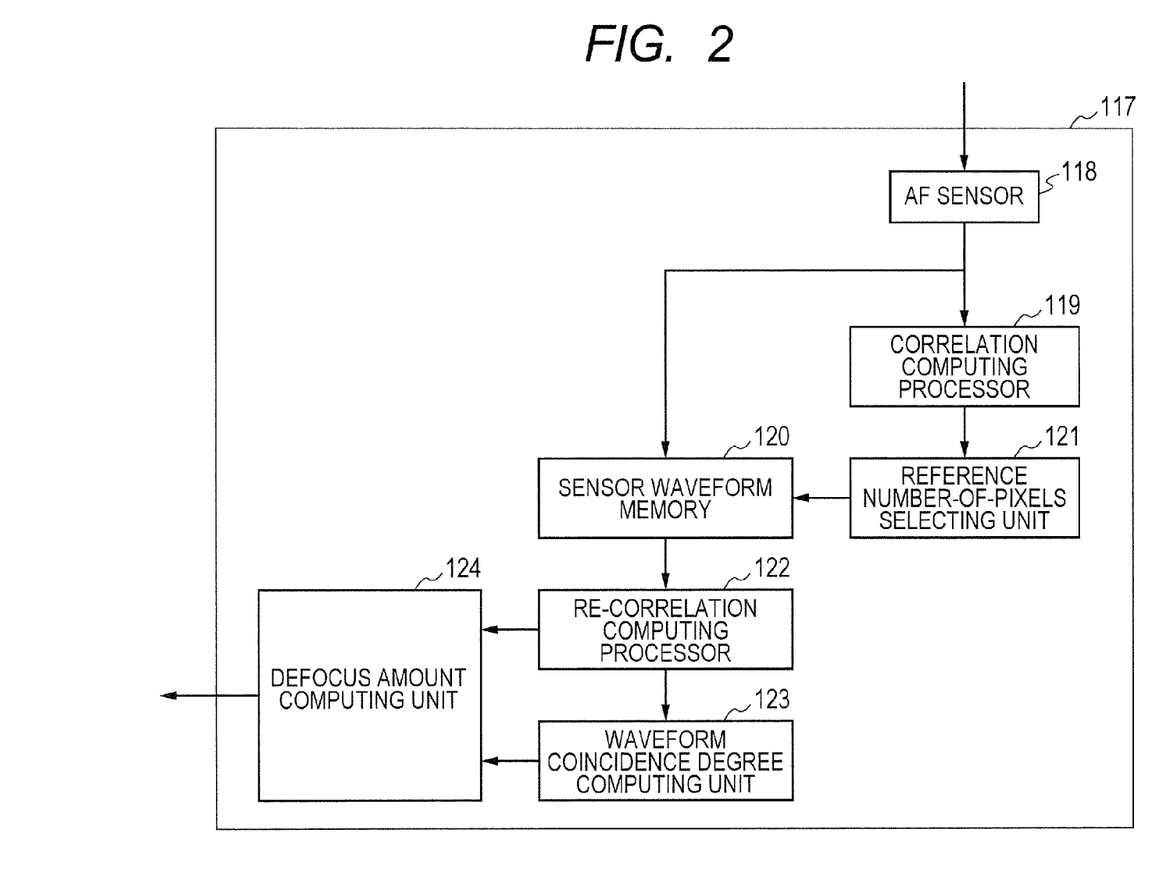
FIG. 2 is a block diagram of the focus detector of the embodiment of the present invention.

FIG. 2 illustrates structure of the focus detector 117. The reflected light reflected by the beam splitting prism 113 enters an AF sensor 118. The AF sensor 118 is formed of a pair of phase difference detecting lenses and a pair of phase difference detecting sensors (line sensors). A pair of images (two images) formed by two light beams after passing through a pair of pupil areas and being divided by the phase difference detecting lens are photoelectric-converted by the phase difference detecting sensor so that image signals are generated. The two image signals (brightness signals) accumulated as charges in the phase difference detecting sensor are read out, are supplied to a correlation computing processor 119 (second correlation computing unit), and are stored in a sensor waveform memory 120.

Hereinafter, a procedure for computing a defocus amount in the automatic focus adjustment device of the present invention is described with reference to the flowchart illustrated in FIG. 3.

Figure 3:
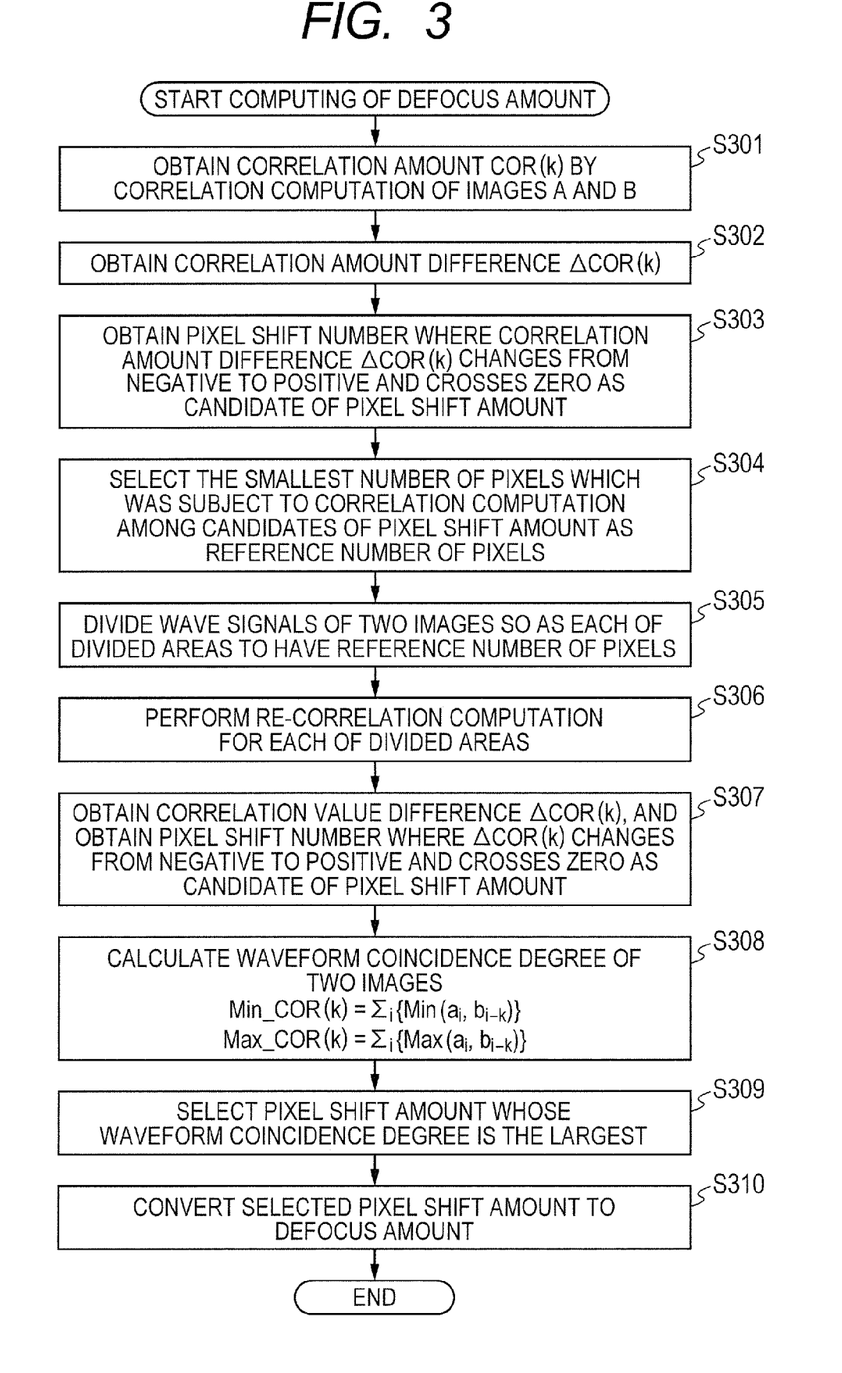
FIG. 3 is a flowchart of defocus amount computation according to the embodiment of the present invention.
Figure 4:
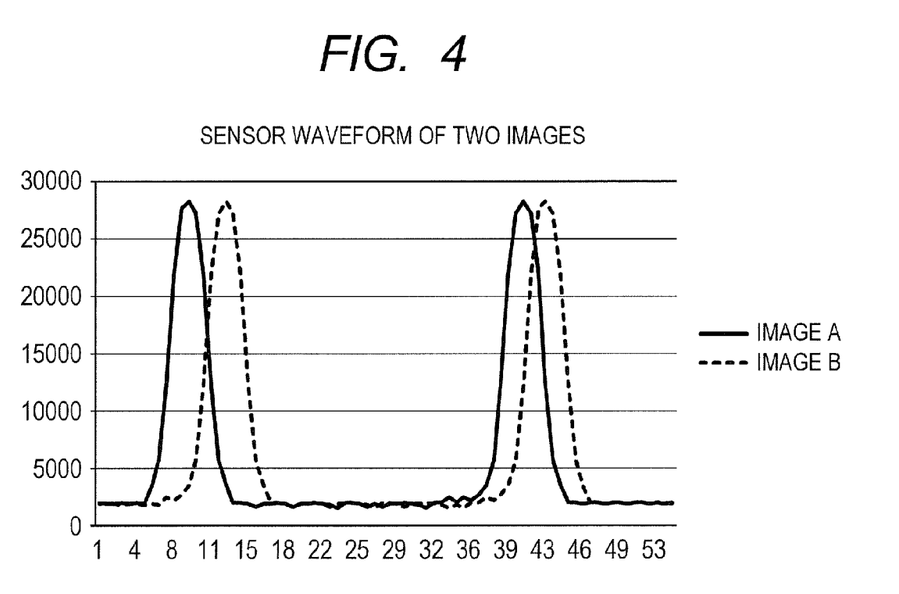
FIG. 4 is a two-image AF sensor waveform diagram.
Figure 5A:
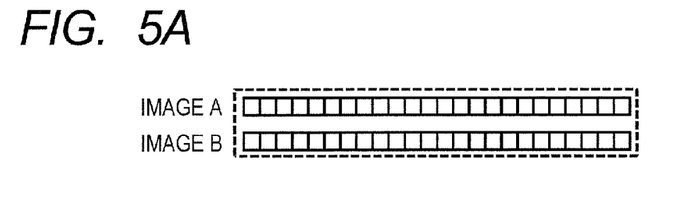
FIG. 5A is a correlation computation pixel diagram with zero shift amount.
Figure 5B:
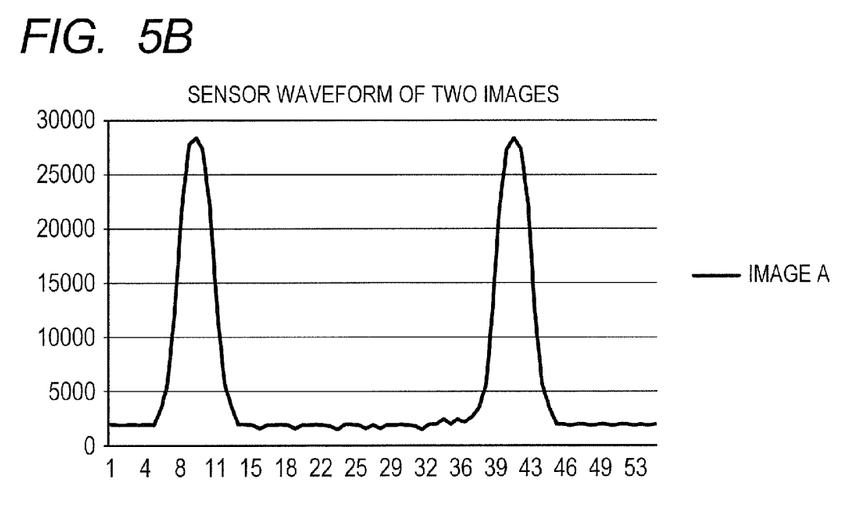
FIG. 5B is a waveform diagram of Image A with zero shift amount.
Figure 5C:
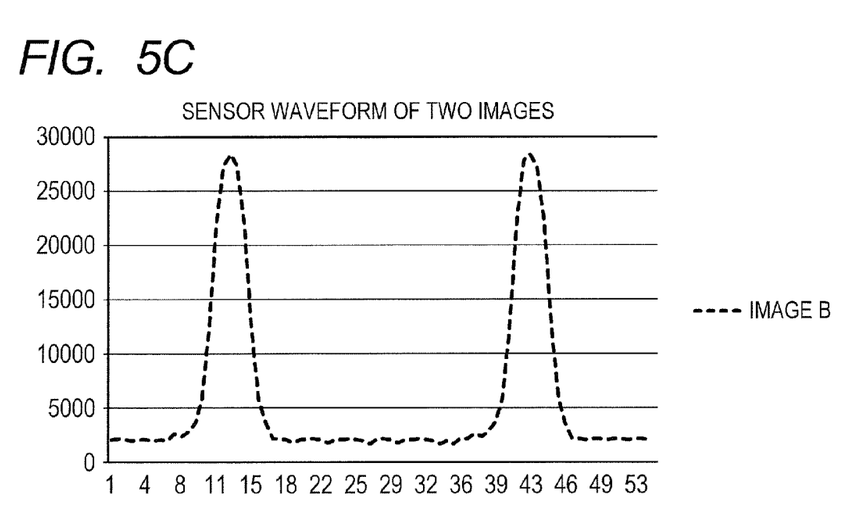
FIG. 5C is a waveform diagram of Image B with zero shift amount.

A case where a pair of sensor waveforms (Image A and Image B) shown in FIG. 4 are supplied to the correlation computing processor 119 is exemplified. FIG. 4 shows the pair of sensor waveforms in an overlapped manner. The sensor waveforms of two images shown in FIG. 4 indicate that two subject images exist on the pair of sensors (from two subjects at different subject distances). The correlation computing processor 119 performs correlation computation on the same position of a pair of sensor pixels as shown in FIG. 5A (between pixels in a broken line portion) (Step S301 in FIG. 3). Image A and Image B as the pair of sensor waveforms in that case are shown in FIG. 5B and in FIG. 5C, respectively.

Here, the correlation computation is computation of obtaining a correlation value COR, which is obtained as a sum of absolute values of differences between corresponding pixel data of Image A and Image B over the entire pixel range for comparing Image A with Image B, and is obtained by the following equation (1).

$$COR = \sum_i |A_i - B_i| \tag{1}$$

where $A_i$ represents the i-th pixel value of Image A, and $B_i$ represents the i-th pixel value of Image B.

Next, a sensor pixel position of Image A is fixed while the sensor waveform of Image B is shifted to the left one by one pixel, so as to perform the correlation computation similarly in the part of the corresponding pixel between Image A and Image B. In this case, in FIG. 6A, pixels are assigned numerals of 1, 2, and so on in order from the left side to the right side. Then, when the waveform of Image B is shifted to the left by k pixels, supposing that the number of total pixels is n, a correlation amount COR(k) (k≥0) is calculated by the following equation (1a) comparing $A_1$ to $A_{n-k}$ with $B_{1+k}$ to $B_n$.

$$COR(k) = \sum_{i=1}^{n-k} |A_i - B_{i+k}| \tag{1a}$$

Figure 6A:
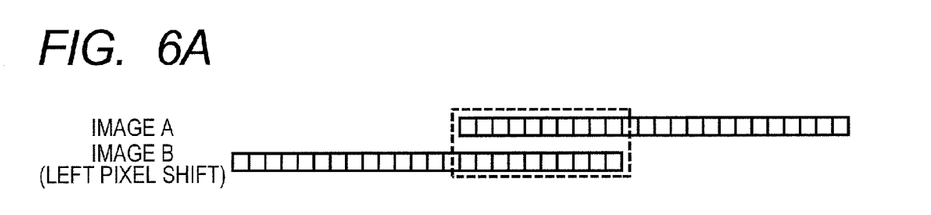
FIG. 6A is a diagram of pixels to be subject to correlation computation when Image B is shifted to the left.
Figure 6B:
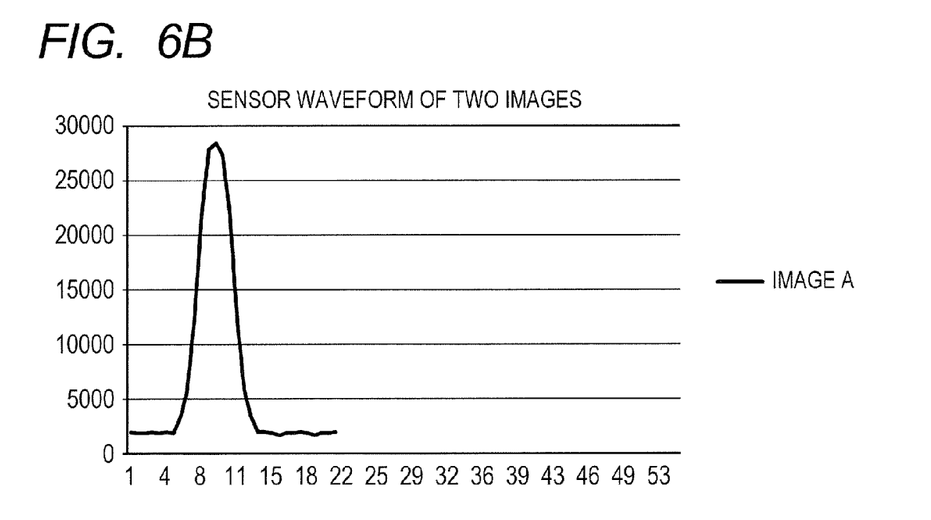
FIG. 6B is a waveform diagram of Image A when Image B is shifted to the left.
Figure 6C:
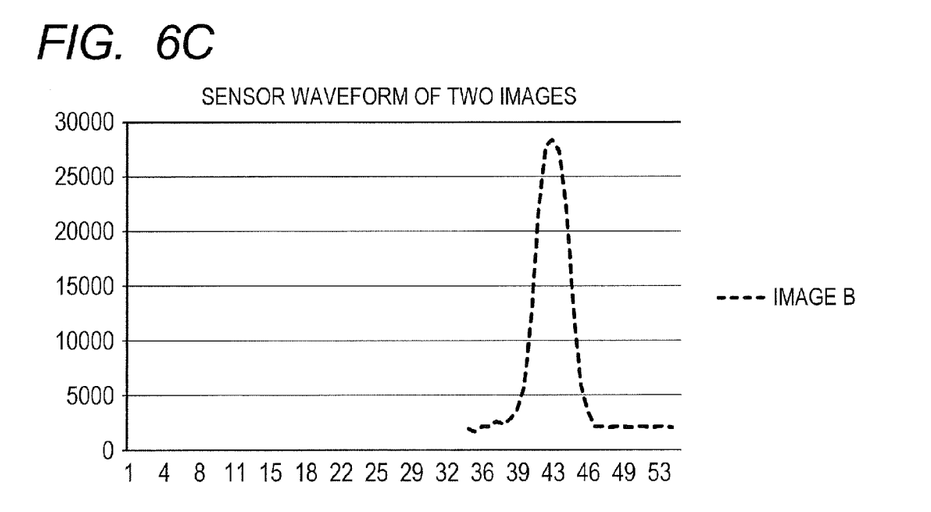
FIG. 6C is a waveform diagram of Image B when Image B is shifted to the left.

Shifting to the left sequentially one by one pixel is repeated until the number of pixels to be subject to correlation computation becomes a predetermined value as shown in FIG. 6A. FIGS. 6B and 6C show sensor waveforms of Image A and Image B when the number of pixels to be subject to correlation computation becomes a predetermined value (in this case, for example, 10 pixels). Here, a predetermined value of the number of pixels to be subject to correlation computation is a lower limit of the number of pixels to be set in advance for preventing a decrease of detection accuracy, because when the number of pixels for the correlation computation is decreased, a defocus range to be subject to focus detection is increased, but the detection accuracy is lowered so that erroneous detection of focus may occur with high probability.

Next, the sensor pixel position of Image A is fixed while the sensor waveform of Image B is shifted to the right one by one pixel so as to perform similar correlation computation. In this case too, the waveform of Image B is shifted to the right by k pixels, and $A_{1+k}$ to $A_n$ are compared with $B_1$ to $B_{n-k}$ respectively so as to calculate the correlation amount. It is supposed that the number of shift is positive when the sensor waveform of Image B is shifted to the left and the number of shift is negative when the sensor waveform of Image B is shifted to the right. In this case, the correlation amount COR(k) (k≤0) is expressed by the equation (1b).

$$COR(k) = \sum_{i=1}^{n+k} |A_{i-k} - B_i| \quad (1b)$$

Figure 7A:
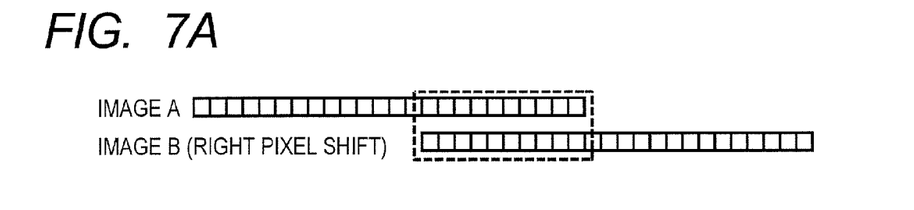
FIG. 7A is a diagram of pixels to be subject to correlation computation when Image B is shifted to the right.
Figure 7B:
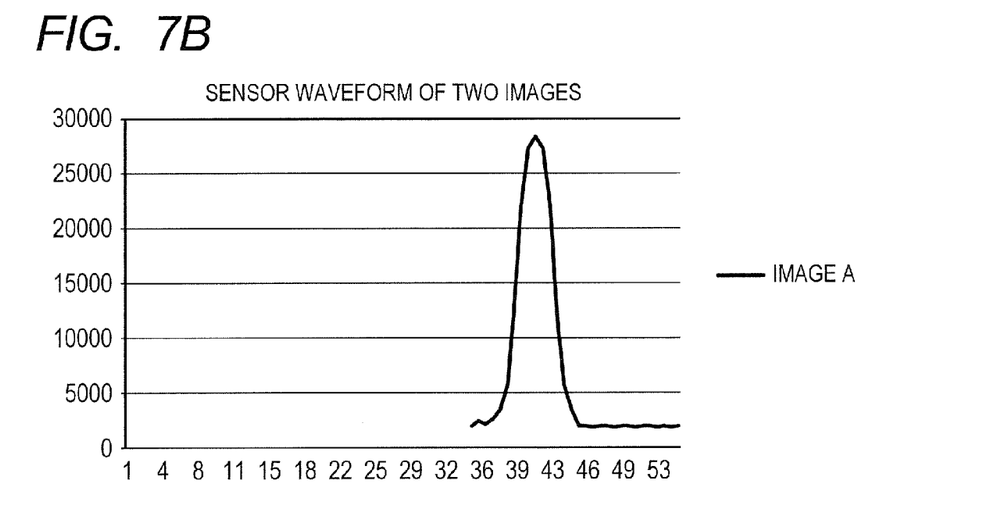
FIG. 7B is a waveform diagram of Image A when Image B is shifted to the right.
Figure 7C:
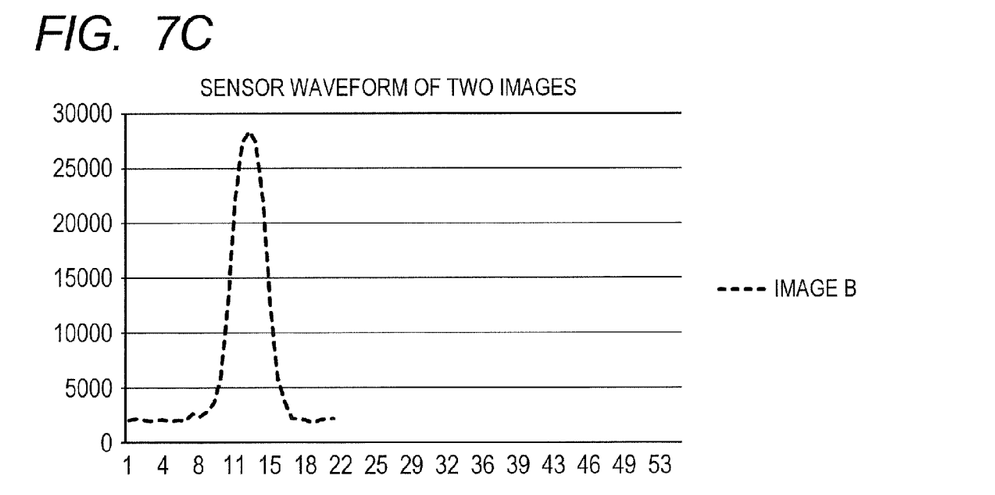
FIG. 7C is a waveform diagram of Image B when Image B is shifted to the right.

Shifting to the right sequentially one by one pixel is repeated until the number of pixels to be subject to correlation computation becomes a predetermined value as shown in FIG. 7A. FIGS. 7B and 7C show the sensor waveforms of Image A and Image B when the number of pixels to be subject to correlation computation becomes a predetermined value (in this case, for example, 10 pixels).

After every correlation computation process is finished, a correlation amount difference ΔCOR(k) between the two images when shifting by k pixels is calculated by the equation (2) based on the correlation amount COR(k) when shifting by k pixels and a correlation amount COR(k+1) when shifting by k+1 pixels (Step S302 in FIG. 3).

$$\Delta COR(k) = \{COR(k) - COR(k+1)\} \times N \quad (2)$$

where N represents a value obtained by dividing the number of pixels to be compared when the number of shifted pixels k is zero by the number of pixels to be compared when the number of shifted pixels is k, because the number of pixels for comparing Image A with Image B depends on a pixel shift amount. In the equation (2), N is multiplied for normalizing with respect to the number of pixels to be compared. When the pixel shift amount k is zero, all pixels in Image A and Image B (55 pixels in this embodiment) are to be subject to correlation computation. In this case, the number of pixels to be subject to correlation computation becomes largest. When Image A and Image B are shifted to the left and to the right relatively one by one pixel, the number of pixels to be subject to correlation computation is decreased one by one pixel. In this embodiment, when the number of pixels to be subject to correlation computation is decreased to 10 pixels as a predetermined number of pixels, the shift process for the correlation computation between Image A and Image B is finished. When the shift pixel amount k is ±45, the number of pixels to be subject to correlation computation is 10.

If the correlation amount COR(k) is zero, Image A and Image B are completely identical have no image displacement therebetween at the shift amount k and in the pixel range to be subject to correlation computation. By evaluating the correlation amount difference ΔCOR(k), the position at which the correlation amount COR(k) changes from a decrease to an increase can be obtained as an in-focus candidate point by the pixel shift amount k of which the correlation amount difference ΔCOR(k) changes from a negative value to a positive value to cross zero (hereinafter, referred to also as a zero crossing point). As the correlation amount difference ΔCOR(k) shown in FIG. 8, it is possible to select the pixel shift amount k at the zero crossing point of the correlation amount difference ΔCOR(k) between two images as a defocus candidate value of the in-focus candidate point (Step S303 in FIG. 3).

Figure 9:
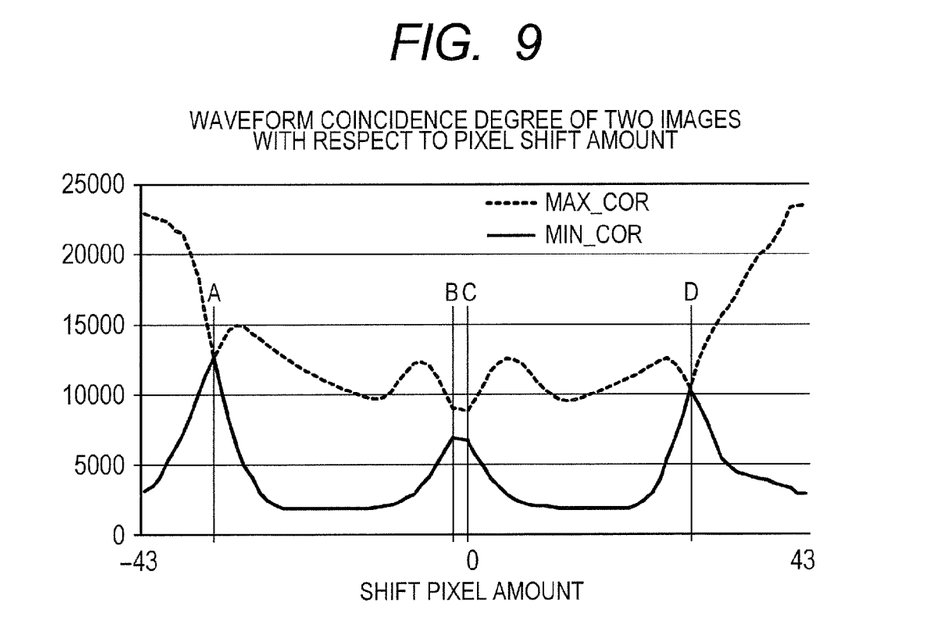
FIG. 9 shows a waveform coincidence degree of two images with respect to the pixel shift amount.

A waveform coincidence degree of two images is shown in FIG. 9 using Min_COR(k) of the equation (3) and Max_COR(k) of the equation (4) as below.

$$\text{Min\_COR}(k) = \sum_i \{\text{Min}(A_i, B_{i-k})\} \quad (3)$$

$$\text{Max\_COR}(k) = \sum_i \{\text{Max}(A_i, B_{i-k})\} \quad (4)$$

where $A_i$ and $B_i$ represent pixel values (brightness) of the i-th pixels of Image A and Image B, respectively, and k represents the pixel shift amount, in which a sum is calculated with respect to all pixels i comparing pixel values of Image A and Image B. In addition, Min(x,y) and Max(x,y) are functions respectively indicating smaller one and larger one of x and y.

Figure 8:
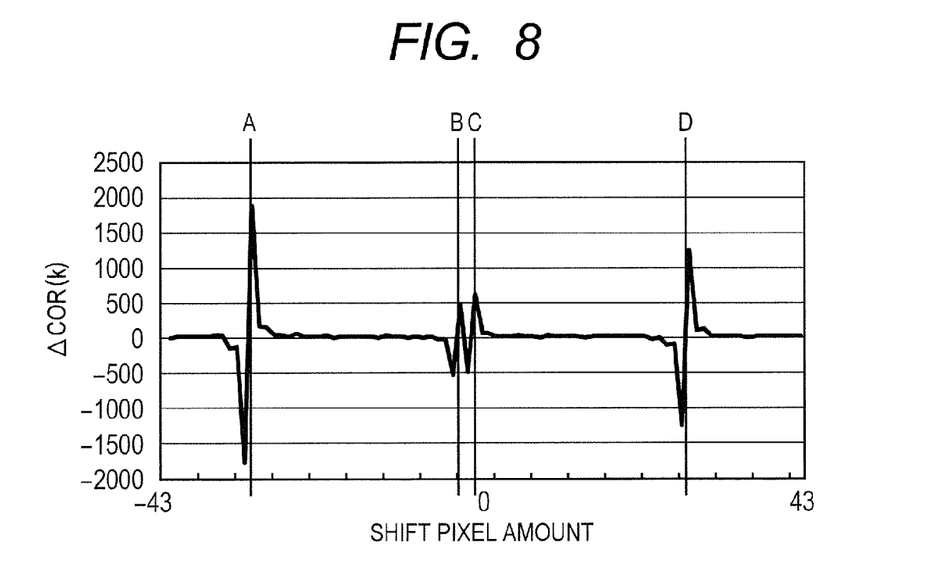
FIG. 8 shows a correlation amount difference between two images with respect to a pixel shift amount.

The waveform coincidence degrees between two images (the waveform coincidence degrees in the pixel shift amounts A, B, C, and D shown in FIG. 9) in the pixel shift amount (pixel shift amounts A, B, C, and D shown in FIG. 8) (image displacement amounts), which is a point at which the correlation amount difference ΔCOR(k) between two images in each pixel shift amount shown in FIG. 8 changes from a negative value to a positive value to cross zero, are compared. Here, if the pixel shift amounts (A and B) in which a difference between Min_COR(k) and Max_COR(k) as waveform coincidence degrees becomes the smallest value are selected as in-focus points, the pixel shift amounts shown in FIGS. 6A and 7A are selected. However, this is a result of correlation computation between different subject images on a pair of different phase difference detecting sensors, which is an erroneous detection due to a small number of pixels to be subject to correlation computation. In the present invention, in order to avoid the erroneous detection due to a small number of pixels to be subject to correlation computation, instead of determining the defocus amount of the in-focus candidate point by evaluating the waveform coincidence degree of two images directly from the defocus candidate value of the in-focus candidate point determined in Step S303 of FIG. 3, the in-focus candidate point is determined by the process of Steps S304 to S307 as described below.

In the present invention, the number of pixels to be subject to correlation computation (correlation computation number of pixels) in one or more candidate values of the pixel shift amount calculated in the correlation computing processor 119 (pixel shift amounts A, B, C, and D shown in FIG. 8) is sent to a reference number-of-pixels selecting unit 121. The reference number-of-pixels selecting unit 121 selects the smallest number of pixels among the supplied correlation computation number of pixels as reference number-of-pixels for re-correlation computation (Step S304 in FIG. 3) and reads brightness waveform signals of two images stored in the sensor waveform memory 120, so as to supply the brightness waveform signals to a re-correlation computing processor 122 (first correlation computing unit). In the waveform exemplified here, because the number of pixels to be subject to correlation computation when the correlation computation is performed at the pixel shift amount A is the smallest number of pixels among the pixel shift amounts A, B, C, and D as the in-focus candidate points, this is selected as the reference number-of-pixels for the re-correlation computation.

The re-correlation computing processor 122 divides the waveform signals of the two images read out from the sensor waveform memory 120 so as to be the reference number-of-pixels (Step S305 in FIG. 3), and performs the similar correlation computation again (re-correlation computation) on each of the divided areas (Step S306 in FIG. 3).

The divided sensor waveforms of the two images are shown for each area in FIGS. 10A to 12C.

Figure 10A:
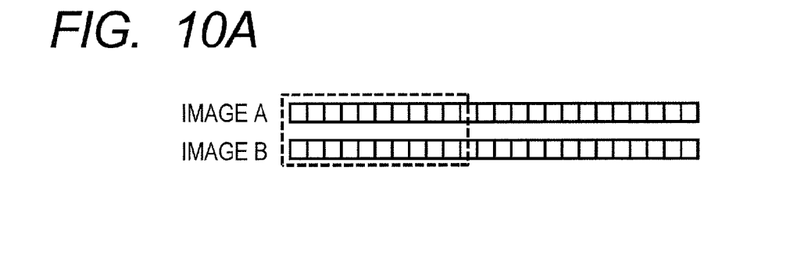
FIG. 10A is a diagram of pixels to be subject to correlation computation with zero pixel shift amount in a left side area.
Figure 10B:
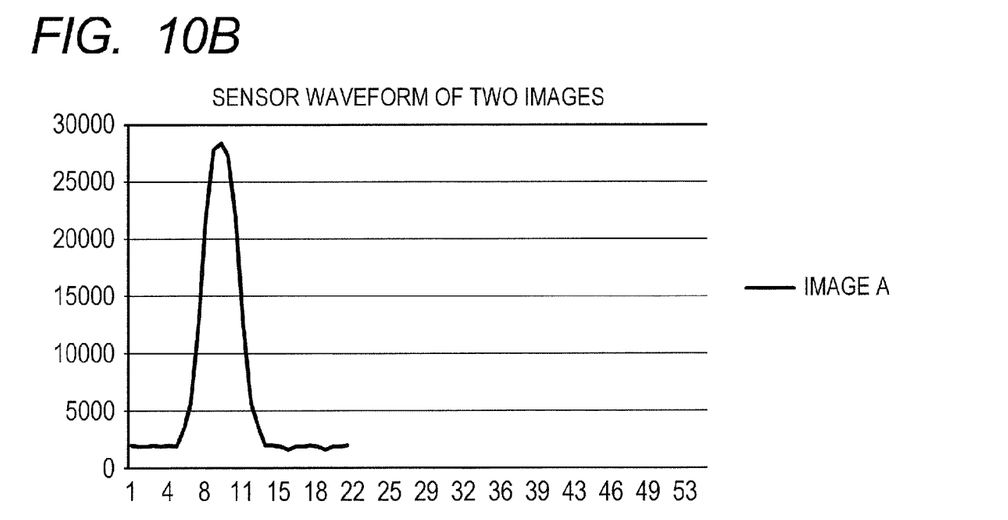
FIG. 10B is a waveform diagram of Image A with zero pixel shift amount in the left side area.
Figure 10C:
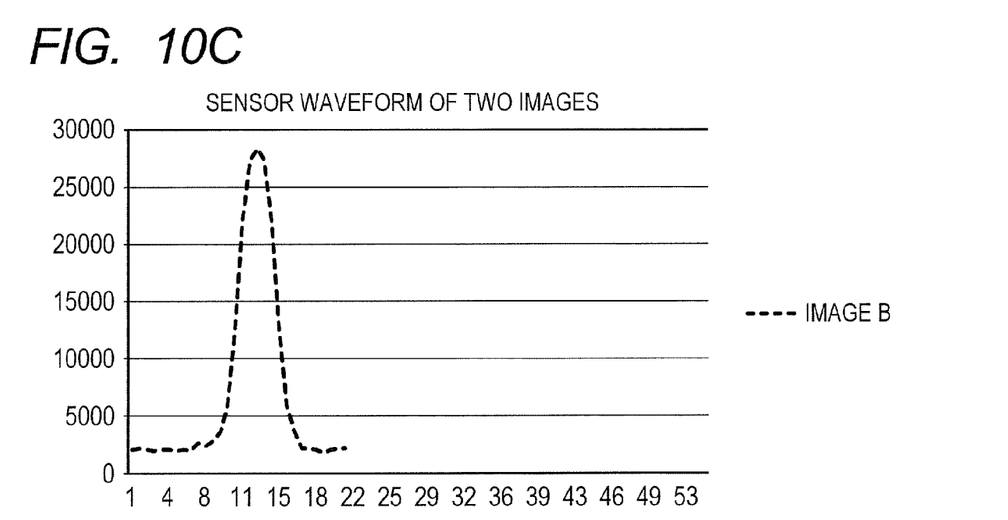
FIG. 10C is a waveform diagram of Image B with zero pixel shift amount in the left side area.

FIG. 10A shows the divided area of pixels in the left side area at the same position of the pair of sensor pixels (between pixels of the broken line portion), and FIGS. 10B and 10C show sensor waveforms of the two images.

Figure 11A:
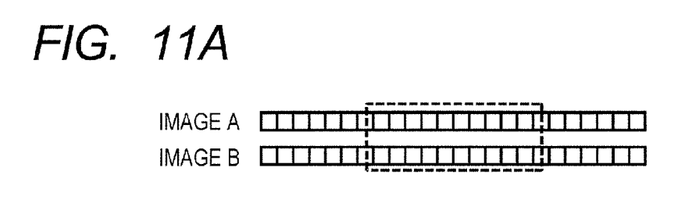
FIG. 11A is a diagram of pixels to be subject to correlation computation with zero pixel shift amount in a center area.
Figure 11B:
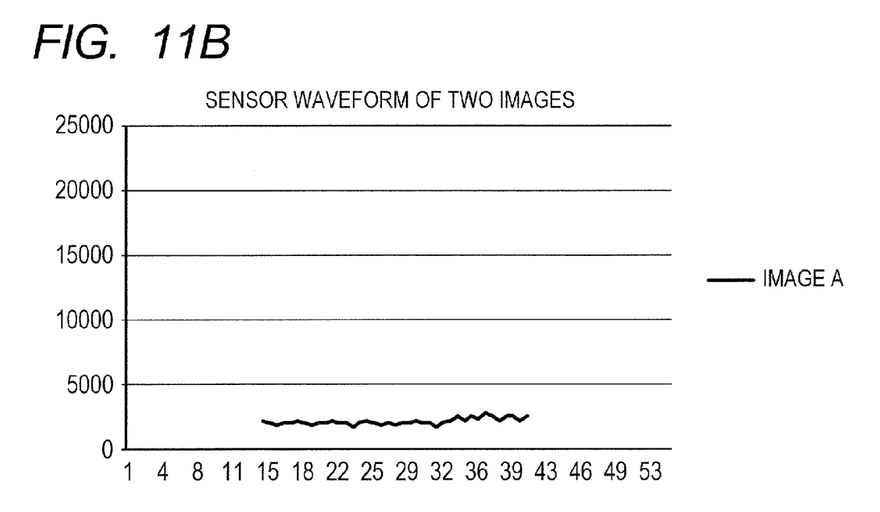
FIG. 11B is a waveform diagram of Image A with zero pixel shift amount in the center area.
Figure 11C:
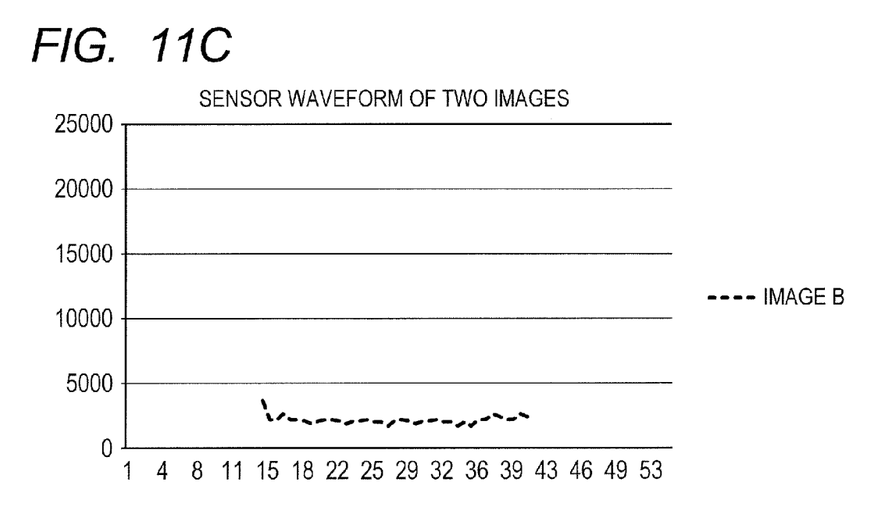
FIG. 11C is a waveform diagram of Image B with zero pixel shift amount in the center area.

FIG. 11A shows the divided area of pixels in the center area at the same position of the pair of sensor pixels (between pixels of the broken line portion), and FIGS. 11B and 11C show sensor waveforms of the two images.

Figure 12A:
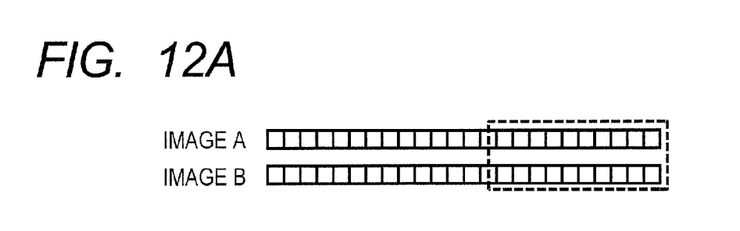
FIG. 12A is a diagram of pixels to be subject to correlation computation with zero pixel shift amount in a right side area.
Figure 12B:
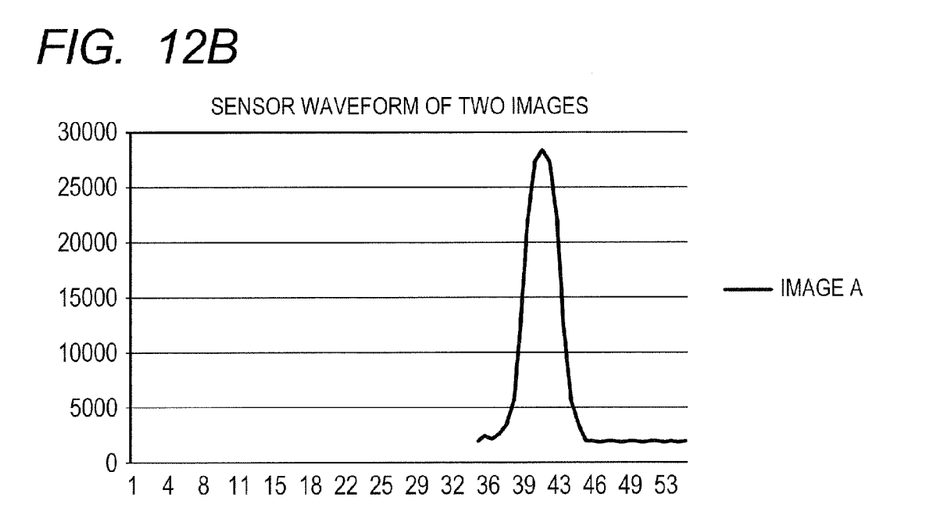
FIG. 12B is a waveform diagram of Image A with zero pixel shift amount in the right side area.
Figure 12C:
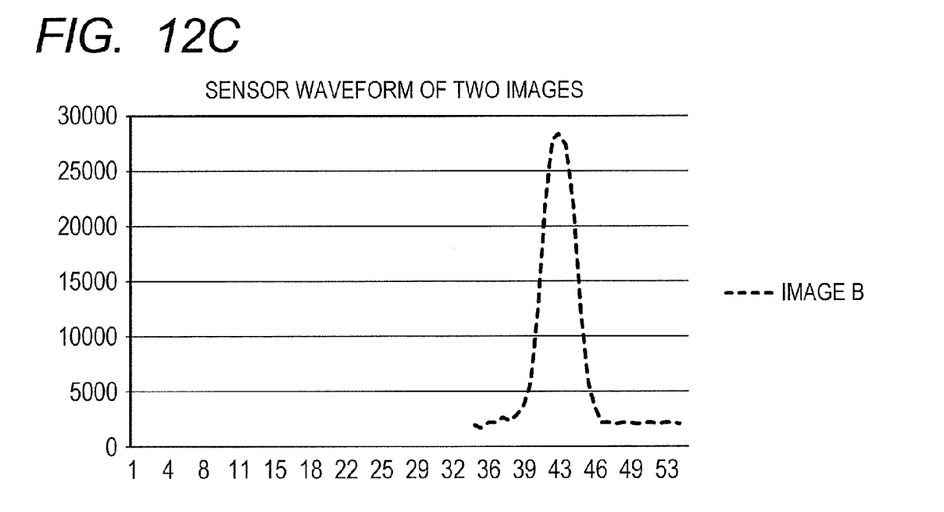
FIG. 12C is a waveform diagram of Image B with zero pixel shift amount in the right side area.

FIG. 12A shows the divided area of pixels in the right side area at the same position of the pair of sensor pixels (between pixels of the broken line portion), and FIGS. 12B and 12C show sensor waveforms of the two images.

With respect to each of the areas of pixels to be subject to computation shown in FIGS. 10A, 11A, and 12A, the correlation amount difference. $\Delta COR(k)$ between two images is computed for the pixel shift amount k by the equation (2) (Step S307 in FIG. 3). The correlation amount difference $\Delta COR(k)$ is computed by shifting Image A and Image B in a relative manner in a range where the number of pixels to be subject to correlation computation is not smaller than the predetermined number of pixels to be subject to correlation computation. Here, similarly to Step S303, by evaluating the correlation amount difference $\Delta COR(k)$, the position where the correlation amount $COR(k)$ changes from a decrease to an increase can be recognized as the in-focus candidate point in the pixel shift amount k at the zero crossing point of the correlation amount difference $\Delta COR(k)$ (Step S307 in FIG. 3).

In the correlation computation with respect to the divided area of pixels including the centers of Image A and Image B shown in FIG. 11A, because there is no zero crossing point of the correlation amount difference $\Delta COR(k)$, it is determined that there is no subject image to be focused in this pixel area.

Figure 13:
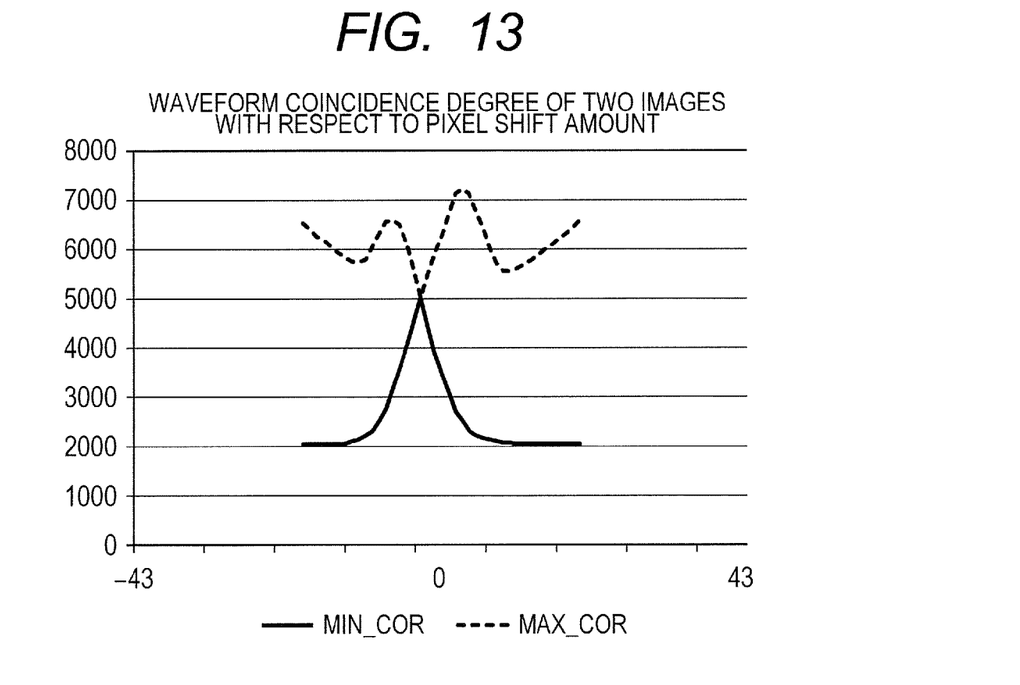
FIG. 13 shows a waveform coincidence degree of two images with respect to the pixel shift amount in the left side area.
Figure 14:
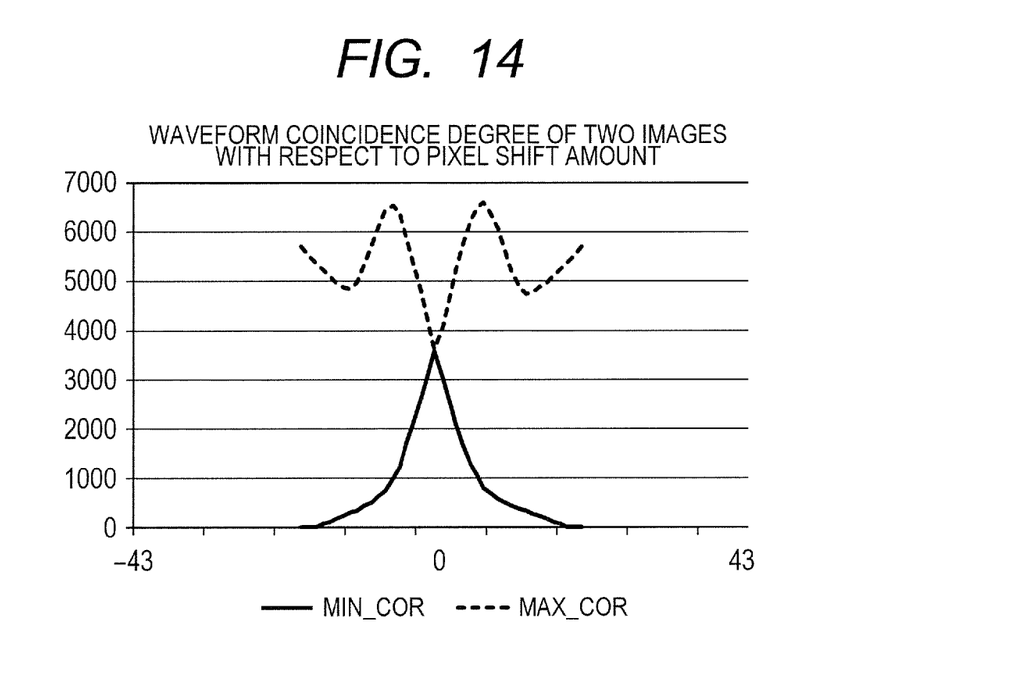
FIG. 14 shows a waveform coincidence degree of two images with respect to the pixel shift amount in the right side area.

A waveform coincidence degree computing unit 123 calculates the waveform coincidence degree by the equations (3) and (4) with respect to the area where the existence of the zero crossing point is confirmed by the correlation computation of the individual divided areas by the re-correlation computing processor 122. In this embodiment, the waveform coincidence degree is computed as shown in FIG. 13 for the left side area of FIG. 10A and is computed as shown in FIG. 14 for the right side area of FIG. 12A (Step S308 in FIG. 3).

From this calculation result, the pixel shift amount having the smallest value of the difference between the waveform coincidence degrees Min_COR and Max_COR is selected. Therefore, the pixel shift amount specified in FIG. 13 or 14 is selected as the pixel shift amount of the in-focus candidate point (Step S309 in FIG. 3).

A defocus amount computing unit 124 selects the pixel shift amount having the highest waveform coincidence degree calculated by the waveform coincidence degree computing unit 123 (the pixel shift amounts B and C corresponding to FIGS. 13 and 14) from the candidate values of the pixel shift amount calculated by the re-correlation computing processor 122, and converts the pixel shift amount having the highest waveform coincidence degree into the defocus value (Step S310 in FIG. 3).

As described above, according to this embodiment, even if plural subject images exist on the sensor to be subject to the AF (from plural subjects at different subject distances), an accurate distance measurement result can be obtained. Therefore, it is possible to obtain a focus detection result achieving both an improvement of the focus detection accuracy and an increase of the defocus range.

In particular, when a moving image is picked up, it is not frequently performed to change a focus condition from focusing on a certain subject at one point in time to focusing on another subject whose object distance is far different from that of the former subject. Therefore, the automatic focus operation for focusing on the subject that is focused at that time or on a subject whose object distance is close to the subject is required more frequently. Therefore, with the structure of the present invention, appropriate automatic focus operation environment can be realized by providing an appropriate in-focus candidate point accurately to the camera operator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-172763, filed Aug. 8, 2011, which is hereby incorporated by reference herein in its entirety.

What is claimed is:

1. A focus detector for detecting a defocus amount of an image pickup optical system based on a displacement amount between a pair of images formed by a pair of light beams divided from the image pickup optical system and passed through a pair of pupil areas, the focus detector comprising:
   a pair of lenses;
   a pair of phase difference detecting sensors for photoelectrically converting a pair of subject images formed by the pair of lenses into a pair of image signals;
   a first correlation computing unit for dividing the pair of image signals based on a reference number-of-pixels to compute an image displacement amount for each divided area;
   a waveform coincidence degree computing unit for computing a coincidence degree of the pair of image signals in the each divided area where the image displacement amount is computed by the first correlation computing unit;
   a defocus amount computing unit for computing a defocus amount based on the coincidence degree of the pair of image signals computed by the waveform coincidence degree computing unit;
   a second correlation computing unit for computing an image displacement amount based on the pair of image signals from the pair of phase difference detecting sensors; and
   a reference number-of-pixels selecting unit for selecting the reference number-of-pixels from among a number of pixels to be subject to computation of the image displacement amount with respect to a plurality of the image displacement amounts computed by the second correlation computing unit.

2. A focus detector according to claim 1, wherein the reference number-of-pixels is a smallest number of pixels among the numbers of pixels to be subject to correlation computation for which one or more in-focus candidate points are determined by the second correlation computing unit.

3. A focus detector according to claim 2, wherein the defocus amount computing unit computes the defocus amount based on the image displacement amount having a highest coincidence degree of the image signals computed by the waveform coincidence degree computing unit in the areas divided based on the reference number-of-pixels.

4. A lens apparatus comprising:
   an image pickup optical system including a focus lens;
   a focus lens driving unit for driving the focus lens;
   a lens controller for controlling the focus lens driving unit; and a focus detector for detecting a defocus amount of the image pickup optical system based on a displacement amount between a pair of images formed by a pair of light beams divided from the image pickup optical system and passed through a pair of pupil areas, the focus detector comprising:
   a pair of lenses;
   a pair of phase difference detecting sensors for photoelectrically converting a pair of subject images formed by the pair of lenses into a pair of image signals;
   a first correlation computing unit for dividing the pair of image signals based on a reference number-of-pixels to compute an image displacement amount for each divided area;
   a waveform coincidence degree computing unit for computing a coincidence degree of the pair of image signals in the each divided area where the image displacement amount is computed by the first correlation computing unit;
   a defocus amount computing unit for computing a defocus amount based on the coincidence degree of the pair of image signals computed by the waveform coincidence degree computing unit;
   a second correlation computing unit for computing an image displacement amount based on the pair of image signals from the pair of phase difference detecting sensors; and
   a reference number-of-pixels selecting unit for selecting the reference number-of-pixels from among a number of pixels to be subject to computation of the image displacement amount with respect to a plurality of the image displacement amounts computed by the second correlation computing unit,
   wherein the lens controller controls the focus lens driving unit based on a focus detection result from the focus detector.

5. An image pickup apparatus comprising:
an image pickup optical system including a focus lens;
a focus lens driving unit for driving the focus lens;
a lens controller for controlling the focus lens driving unit;
a focus detector for detecting a defocus amount of the image pickup optical system based on a displacement amount between a pair of images formed by a pair of light beams divided from the image pickup optical system and passed through a pair of pupil areas; and
an image pickup element for imaging a subject image formed by the image pickup optical system,
wherein the focus detector comprises:
   a pair of lenses;
   a pair of phase difference detecting sensors for photoelectrically converting a pair of subject images formed by the pair of lenses into a pair of image signals;
   a first correlation computing unit for dividing the pair of image signals based on a reference number-of-pixels to compute an image displacement amount for each divided area;
   a waveform coincidence degree computing unit for computing a coincidence degree of the pair of image signals in the each divided area where the image displacement amount is computed by the first correlation computing unit;
   a defocus amount computing unit for computing a defocus amount based on the coincidence degree of the pair of image signals computed by the waveform coincidence degree computing unit;
   a second correlation computing unit for computing an image displacement amount based on the pair of image signals from the pair of phase difference detecting sensors; and
   a reference number-of-pixels selecting unit for selecting the reference number-of-pixels from among a number of pixels to be subject to computation of the image displacement amount with respect to a plurality of the image displacement amounts computed by the second correlation computing unit,
   wherein the lens controller controls the focus lens driving unit based on a focus detection result from the focus detector.

6. A focus detector for detecting a defocus amount of an image pickup optical system based on a displacement amount between a pair of images formed by a pair of light beams divided from the image pickup optical system and passed through a pair of pupil areas, the focus detector comprising:
   a pair of lenses;
   a pair of phase difference detecting sensors for photoelectrically converting a pair of subject images formed by the pair of lenses into a pair of image signals, wherein each of the image signals comprises a number of pixel values;
   a second correlation computing unit for computing correlation values between the pair of image signals in dependence of relative shifts between the pixel values of the pair of image signals and for computing one or more in-focus candidate points based on the correlation values, wherein the second correlation computing unit takes into account a number of pixel values and the respective relative shift in computing each of the correlation values; and
   a reference number-of-pixels selecting unit for selecting a reference number-of-pixels, wherein the reference number-of pixels is a smallest number of pixels among the numbers of pixels to be subject to correlation computation for which one or more in-focus candidate points are determined by the second correlation computing unit;
   a first correlation computing unit for dividing each of the pair of image signals based on the reference number-of-pixels to obtain respective divided areas and to compute a respective image displacement amount for each of the divided areas;
   a waveform coincidence degree computing unit for computing a respective coincidence degree of the pair of image signals in each of the divided areas based on the respective image displacement amounts; and
   a defocus amount computing unit for computing a defocus amount based on the coincidence degrees.

7. A focus detector according to claim 6, wherein the defocus amount computing unit is adapted to compute the defocus amount based on the image displacement amount having a highest coincidence degree of the image signals computed by the waveform coincidence degree computing unit in the divided areas.

8. A lens apparatus comprising:
an image pickup optical system including a focus lens;
a focus lens driving unit for driving the focus lens;
a lens controller for controlling the focus lens driving unit; and
a focus detector configured to detect a defocus amount of the image pickup optical system based on a displacement amount between a pair of images formed by a pair of light beams divided from the image pickup optical system and passed through a pair of pupil areas, the focus detector comprising:
a pair of lenses;
a pair of phase difference detecting sensors for photoelectrically converting a pair of subject images formed by the pair of lenses into a pair of image signals, wherein each of the image signals comprises a number of pixel values;
a second correlation computing unit for computing correlation values between the pair of image signals in dependence of relative shifts between the pixel values of the pair of image signals and for computing one or more in-focus candidate points based on the correlation values, wherein the second correlation computing unit takes into account a number of pixel values and the respective relative shift in computing each of the correlation values;
a reference number-of-pixels selecting unit for selecting a reference number-of-pixels, wherein the reference number-of pixels is a smallest number of pixels among the numbers of pixels to be subject to correlation computation for which one or more in-focus candidate points are determined by the second correlation computing unit;
a first correlation computing unit for dividing each of the pair of image signals based on the reference number-of-pixels to obtain respective divided areas and to compute a respective image displacement amount for each of the divided areas;
a waveform coincidence degree computing unit for computing a respective coincidence degree of the pair of image signals in each of the divided areas based on the respective image displacement amounts; and
a defocus amount computing unit for computing a defocus amount based on the coincidence degrees,
wherein the lens controller is adapted to control the focus lens driving unit based on the defocus amount from the focus detector.

9. An image pickup apparatus comprising:
a lens apparatus comprising:
an image pickup optical system including a focus lens;
a focus lens driving unit for driving the focus lens;
a lens controller for controlling the focus lens driving unit; and
a focus detector configured to detect a defocus amount of the image pickup optical system based on a displacement amount between a pair of images formed by a pair of light beams divided from the image pickup optical system and passed through a pair of pupil areas; and
an image pickup element for imaging a subject image formed by the image pickup optical system,
wherein the focus detector comprises:
a pair of lenses;
a pair of phase difference detecting sensors for photoelectrically converting a pair of subject images formed by the pair of lenses into a pair of image signals, wherein each of the image signals comprises a number of pixel values;
a second correlation computing unit for computing correlation values between the pair of image signals in dependence of relative shifts between the pixel values of the pair of image signals and for computing one or more in-focus candidate points based on the correlation values, wherein the second correlation computing unit takes into account a number of pixel values and the respective relative shift in computing each of the correlation values;
a reference number-of-pixels selecting unit for selecting a reference number-of-pixels, wherein the reference number-of pixels is a smallest number of pixels among the numbers of pixels to be subject to correlation computation for which one or more in-focus candidate points are determined by the second correlation computing unit;
a first correlation computing unit for dividing each of the pair of image signals based on the reference number-of-pixels to obtain respective divided areas and to compute a respective image displacement amount for each of the divided areas;
a waveform coincidence degree computing unit for computing a respective coincidence degree of the pair of image signals in each of the divided areas based on the respective image displacement amounts; and
a defocus amount computing unit for computing a defocus amount based on the coincidence degrees,
wherein the lens controller is adapted to control the focus lens driving unit based on the defocus amount from the focus detector.

* * * * *